United States Patent
Prasad et al.

(10) Patent No.: US 12,009,715 B2
(45) Date of Patent: Jun. 11, 2024

(54) ELECTRONIC GEAR CHANGING MULTIFUNCTION INVERTER

(71) Applicant: GM GLOBAL TECHNOLOGY OPERATIONS LLC, Detroit, MI (US)

(72) Inventors: Rashmi Prasad, Troy, MI (US); Chandra S. Namuduri, Troy, MI (US); Lei Hao, Troy, MI (US); Suresh Gopalakrishnan, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 240 days.

(21) Appl. No.: 17/729,216

(22) Filed: Apr. 26, 2022

(65) Prior Publication Data

US 2023/0344293 A1 Oct. 26, 2023

(51) Int. Cl.
*H02K 3/28* (2006.01)
*H02K 11/33* (2016.01)

(52) U.S. Cl.
CPC ............. *H02K 3/28* (2013.01); *H02K 11/33* (2016.01)

(58) Field of Classification Search
CPC ........ H02K 19/103; H02K 11/33; H02P 25/08
USPC ............................ 318/254.1, 400.26, 400.31
See application file for complete search history.

(56) References Cited

U.S. PATENT DOCUMENTS

| 9,882,521 | B2 | 1/2018 | Namuduri et al. |
| 2014/0239876 | A1* | 8/2014 | Hao .................. H02P 25/188 318/724 |
| 2017/0310263 | A1* | 10/2017 | Namuduri .......... H02P 25/022 |

OTHER PUBLICATIONS

Vincent (EP 1775823 A2) Electrical Machine (Year: 2007).*
Kim Yong Ho (KR 20160059203 A) Electric Motor System for Vehicle and Method for Variabling Winding Number of Coil for Electric Motor for Vehicle (Year: 2016).*

* cited by examiner

*Primary Examiner* — Jorge L Carrasquillo (57) ABSTRACT

A method includes: selectively actuating switches of an inverter module and first, second, third, and fourth switches of a motor; and charging a battery with power from a charger using at least one of first, second, and third stator windings of the motor, the battery having a first voltage and being electrically connected in parallel with the inverter module, and the charger having a second voltage that is less than the first voltage.

20 Claims, 9 Drawing Sheets

ELECTRONIC GEAR CHANGING MULTIFUNCTION INVERTER

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to motor control systems and methods and more particularly to systems and methods for controlling switches of inverters and motors of vehicles for battery charging.

Some types of vehicles include only an internal combustion engine that generates propulsion torque. Electric vehicles may not include an internal combustion engine and may rely on one or more electric motors for propulsion.

Hybrid vehicles include both an internal combustion engine and one or more electric motors. Some types of hybrid vehicles utilize the electric motor and the internal combustion engine in an effort to achieve greater fuel efficiency than if only the internal combustion engine was used. Some types of hybrid vehicles utilize the electric motor and the internal combustion engine to achieve greater torque output than the internal combustion could achieve by itself.

Some example types of hybrid vehicles include parallel hybrid vehicles, series hybrid vehicles, and other types of hybrid vehicles. In a parallel hybrid vehicle, the electric motor works in parallel with the engine to combine power and range advantages of the engine with efficiency and regenerative braking advantages of electric motors. In a series hybrid vehicle, the engine drives a generator to produce electricity for the electric motor, and the electric motor drives a transmission. This allows the electric motor to assume some of the power responsibilities of the engine, which may permit the use of a smaller and possibly more efficient engine.

SUMMARY

In a feature, a system includes: a motor including: a first stator winding including first and second stator winding portions electrically connected in series; a second stator winding including third and fourth stator winding portions electrically connected in series; a third stator winding including fifth and sixth stator winding portions electrically connected in series; a first switch electrically connected between (a) a first node between the first and second stator winding portions and (b) a second node between the third and fourth stator winding portions; a second switch electrically connected between (a) the second node between the third and fourth stator winding portions and (b) a third node between the fifth and sixth stator winding portions; a third switch electrically connected between the second stator winding portion and a fourth node connected to the fourth stator winding portion; and a fourth switch electrically connected between the sixth stator winding portion and the fourth node; an inverter module including first, second, and third phases that are electrically connected to the first, second, and third stator windings, respectively; a battery that has a first voltage and that is electrically connected in parallel with the inverter module; a charger that is electrically connected to the motor and that has a second voltage that is less than the first voltage; and a motor control module configured to selectively actuate switches of the inverter module and the first, second, third, and fourth switches of the motor and thereby charge the battery with power from the charger using at least one of the first, second, and third stator windings of the motor.

In further features, the first, second, third, fourth, fifth, and sixth stator winding portions include inductances of between $\frac{1}{10}$ millihenry (mH) and 100 mH.

In further features, the first voltage is 800 volts direct current (DC).

In further features, the second voltage is 400 volts DC.

In further features, the motor control module is configured to, when a speed of the motor is greater than zero and less than a predetermined speed, maintain the first and second switches open and: selectively close the third switch; and selectively close the fourth switch.

In further features, the motor control module is further configured to, when the speed of the motor is greater than the predetermined speed: selectively close the first switch and open the third switch; and selectively close the second switch and open the fourth switch.

In further features, the charger is electrically connected to the first stator winding portion.

In further features, the charger is electrically connected to the fourth node.

In further features, the motor control module is configured to: during a first period: open all switches of the inverter module; and close at least one of the first, second, third, and fourth switches of the motor and flow current through at least one of the first, second, and third stator windings; open the other ones of the first, second, third, and fourth switches of the motor; and during a second period after the first period: close one of the switches of one of the first, second, and third phases of the inverter module; and maintain open all of the other switches of the inverter module; and maintain closed at least one of the first, second, third, and fourth switches of the motor and flow current through at least one of the first, second, and third stator windings; and maintain open the other ones of the first, second, third, and fourth switches of the motor.

In further features: the first stator winding further includes a seventh stator winding portion electrically connected in series with the first and second stator winding portions; the second stator winding further includes an eighth stator winding portion electrically connected in series with the third and fourth stator winding portions; the third stator winding further includes a ninth stator winding portion electrically connected in series with the fifth and sixth stator winding portions; the fourth node is electrically connected between the fourth and eighth stator winding portions; and the motor further includes: a fifth switch electrically connected between seventh stator winding portion and a fifth node connected to the eighth stator winding portion; and a sixth switch electrically connected between the ninth stator winding portion and the fifth node.

In further features, the motor control module is configured to selectively actuate the switches of the inverter module and the first, second, third, and fourth switches of the motor and thereby charge the battery with power from the charger using one of the first, second, and third stator windings at a time.

In further features, the motor control module is configured to actuate the switches of the inverter module and the first, second, third, and fourth switches of the motor and thereby charge the battery with power from the charger using the first, second, and third stator windings in a predetermined alternating order.

In further features, the motor control module is configured to selectively actuate switches of the inverter module and the first, second, third, and fourth switches of the motor and thereby charge the battery with power from the charger using two of the first, second, and third stator windings at a time.

In further features, the motor control module is configured to selectively actuate switches of the inverter module and the first, second, third, and fourth switches of the motor and thereby charge the battery with power from the charger using all of the first, second, and third stator windings at a time.

In a feature, a method includes: selectively actuating switches of an inverter module and first, second, third, and fourth switches of a motor; and charging a battery with power from a charger using at least one of first, second, and third stator windings of the motor, the motor including: the first stator winding including first and second stator winding portions electrically connected in series; the second stator winding including third and fourth stator winding portions electrically connected in series; the third stator winding including fifth and sixth stator winding portions electrically connected in series; the first switch electrically connected between (a) a first node between the first and second stator winding portions and (b) a second node between the third and fourth stator winding portions; the second switch electrically connected between (a) the second node between the third and fourth stator winding portions and (b) a third node between the fifth and sixth stator winding portions; the third switch electrically connected between the second stator winding portion and a fourth node connected to the fourth stator winding portion; and the fourth switch electrically connected between the sixth stator winding portion and the fourth node; the inverter module including first, second, and third phases that are electrically connected to the first, second, and third stator windings, respectively; the battery having a first voltage and being electrically connected in parallel with the inverter module; and the charger having a second voltage that is less than the first voltage.

In further features, the first, second, third, fourth, fifth, and sixth stator winding portions include inductances of between ¹/₁₀ millihenry (mH) and 100 mH.

In further features, the method further includes, when a speed of the motor is greater than zero and less than a predetermined speed, maintaining the first and second switches open and: selectively closing the third switch; and selectively closing the fourth switch.

In further features, the method further includes, when the speed of the motor is greater than the predetermined speed: selectively closing the first switch and open the third switch; and selectively closing the second switch and open the fourth switch.

In further features, the charger is electrically connected to the first stator winding portion.

In further features, the charger is electrically connected to the fourth node.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A vehicle includes a battery having a first voltage rating, such as 800 volts (V) direct current (DC) or another suitable voltage rating. Some chargers may be configured to directly charge the battery. Other chargers may include a second voltage rating that is less than the first voltage rating and therefore be unable to, by itself, charge the battery.

The vehicle may include a DC to DC converter configured to boost the output of a charger having the second voltage rating. DC to DC converters, however, are costly, add weight to the vehicle, and take up space of the vehicle.

The present application involves using stator windings of an electric motor of a vehicle to boost the output voltage of the charger having the second voltage to charge the battery. The stator windings each include two or more individual stator winding portions that are connected in series. The electric motor also includes switches configured to allow the stator winding portions to be used individually to drive a rotor of the electric motor (e.g., for high speed operation of the electric motor) and together in series to drive the rotor (e.g., for low speed operation of the electric motor).

Figure 1:
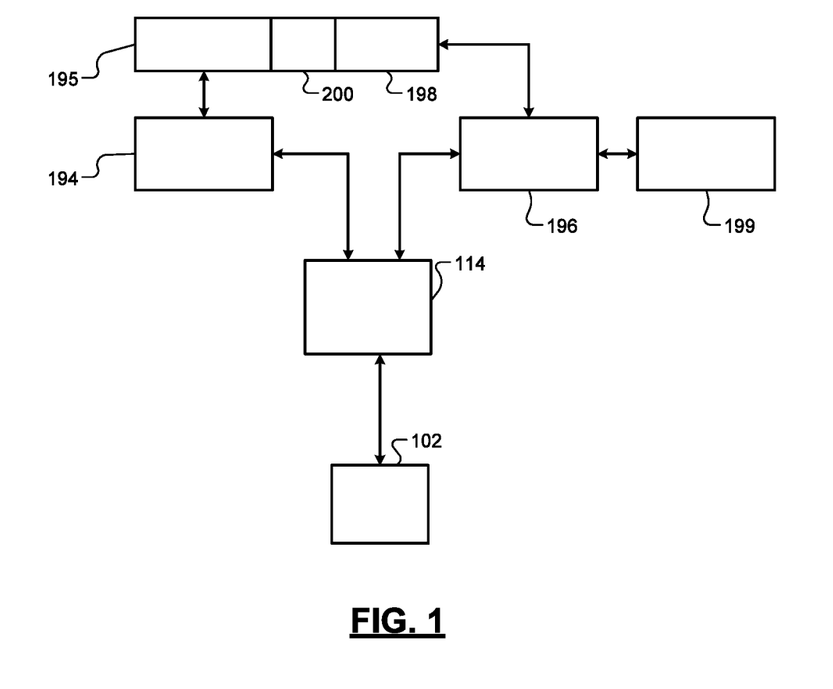
FIG. 1 is a functional block diagram of an example vehicle system.

Referring now to FIG. 1, a functional block diagram of an example vehicle system is presented. While a vehicle system for a hybrid vehicle is shown and will be described, the present disclosure is also applicable to electric vehicles that do not include an internal combustion engine (including pure electric vehicles), fuel cell vehicles, autonomous vehicles, semi-autonomous vehicles, non-autonomous vehicles, and other types of vehicles. Also, while the example of a vehicle is provided, the present application is also applicable to non-vehicle implementations.

An engine 102 may combust an air/fuel mixture to generate drive torque. An engine control module (ECM) 114 controls the engine 102. For example, the ECM 114 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators. In some types of vehicles (e.g., electric vehicles), the engine 102 may be omitted.

The engine 102 may output torque to a transmission 195. A transmission control module (TCM) 194 controls operation of the transmission 195. For example, the TCM 194 may control gear selection within the transmission 195 and one or more torque transfer devices (e.g., a torque converter, one or more clutches, etc.).

The vehicle system includes one or more electric motors, such as electric motor 198. An electric motor can act as either a generator or as a motor at a given time. When acting as a generator, an electric motor converts mechanical energy into electrical energy. The electrical energy can be, for example, used to charge a battery 199. When acting as a motor, an electric motor generates torque that may be used, for example, for vehicle propulsion. While the example of one electric motor is provided, the vehicle may include more than one electric motor.

A motor control module 196 controls power flow from the battery 199 to the electric motor 198 and from the electric motor 198 to the battery 199. The motor control module 196 applies electrical power from the battery 199 to the electric motor 198 to cause the electric motor 198 to output positive torque, such as for vehicle propulsion. The battery 199 may include, for example, one or more batteries and/or battery packs.

The electric motor 198 may output torque, for example, to an input shaft of the transmission 195 or to an output shaft of the transmission 195. A clutch 200 may be engaged to couple the electric motor 198 to the transmission 195 and disengaged to decouple the electric motor 198 from the transmission 195. One or more gearing devices may be implemented between an output of the clutch 200 and an input of the transmission 195 to provide a predetermined ratio between rotation of the electric motor 198 and rotation of the input of the transmission 195.

The motor control module 196 may also selectively convert mechanical energy of the vehicle into electrical energy. More specifically, the electric motor 198 generates and outputs power via back EMF when the electric motor 198 is being driven by the transmission 195 and the motor control module 196 is not applying power to the electric motor 198 from the battery 199. The motor control module 196 may charge the battery 199 via the power output by the electric motor 198.

Figure 2:
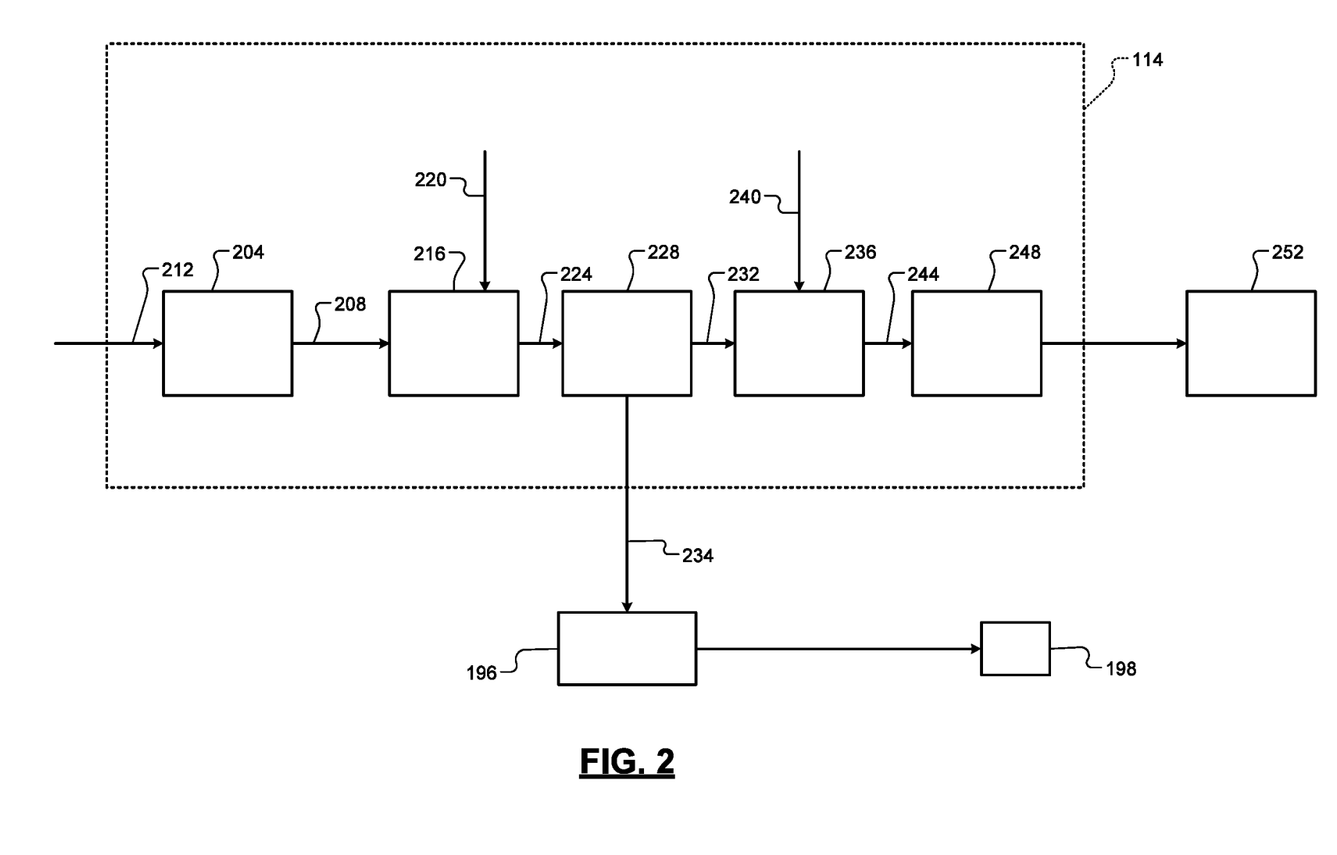
FIG. 2 is a functional block diagram of an example propulsion control system.

Referring now to FIG. 2, a functional block diagram of an example propulsion control system is presented. A driver torque module 204 determines a driver torque request 208 based on driver input 212. The driver input 212 may include, for example, an accelerator pedal position (APP), a brake pedal position (BPP), cruise control input, and/or an autonomous input. In various implementations, the cruise control input may be provided by an adaptive cruise control system that attempts to maintain at least a predetermined distance between the vehicle and objects in a path of the vehicle. The autonomous input may be provided by an autonomous driving system that controls movement of a vehicle from location to location while avoiding objects and other vehicles. The driver torque module 204 may determine the driver torque request 208 using one or more lookup tables or equations that relate the driver inputs to driver torque requests. The APP and BPP may be measured using one or more APP sensors and BPP sensors, respectively.

The driver torque request 208 may be an axle torque request. Axle torques (including axle torque requests) refer to torque at the wheels. As discussed further below, propulsion torques (including propulsion torque requests) are different than axle torques in that propulsion torques may refer to torque at a transmission input shaft.

An axle torque arbitration module 216 arbitrates between the driver torque request 208 and other axle torque requests 220. Axle torque (torque at the wheels) may be produced by various sources including the engine 102 and/or one or more electric motors, such as the electric motor 198. Examples of the other axle torque requests 220 include, but are not limited to, a torque reduction requested by a traction control system when positive wheel slip is detected, a torque increase request to counteract negative wheel slip, brake management requests to reduce axle torque to ensure that the axle torque does not exceed the ability of the brakes to hold the vehicle when the vehicle is stopped, and vehicle over-speed torque requests to reduce the axle torque to prevent the vehicle from exceeding a predetermined speed. The axle torque arbitration module 216 outputs one or more axle torque requests 224 based on the results of arbitrating between the received axle torque requests 208 and 220.

In hybrid vehicles, a hybrid module 228 may determine how much of the one or more axle torque requests 224 should be produced by the engine 102 and how much of the one or more axle torque requests 224 should be produced by the electric motor 198. The example of the electric motor 198 will be continued for simplicity, but multiple electric motors may be used. The hybrid module 228 outputs one or more engine torque requests 232 to a propulsion torque arbitration module 236. The engine torque requests 232 indicate a requested torque output of the engine 102.

The hybrid module 228 also outputs a motor torque request 234 to the motor control module 196. The motor torque request 234 indicates a requested torque output (positive or negative) of the electric motor 198. In vehicles where the engine 102 is omitted (e.g., electric vehicles) or is not connected to output propulsion torque for the vehicle, the axle torque arbitration module 216 may output one axle torque request and the motor torque request 234 may be equal to that axle torque request.

In the example of an electric vehicle, the ECM 114 may be omitted, and the driver torque module 204 and the axle torque arbitration module 216 may be implemented within the motor control module 196. In electric vehicles, the driver torque module 204 may input the driver torque request 208 to the motor control module 196, and the components related to controlling engine actuators may be omitted.

The propulsion torque arbitration module 236 converts the engine torque requests 232 from an axle torque domain (torque at the wheels) into a propulsion torque domain (e.g., torque at an input shaft of the transmission). The propulsion torque arbitration module 236 arbitrates the converted torque requests with other propulsion torque requests 240. Examples of the other propulsion torque requests 240 include, but are not limited to, torque reductions requested for engine over-speed protection and torque increases requested for stall prevention. The propulsion torque arbitration module 236 may output one or more propulsion torque requests 244 as a result of the arbitration.

An actuator control module 248 controls engine actuators 252 of the engine 102 based on the propulsion torque requests 244. For example, based on the propulsion torque requests 244, the actuator control module 248 may control opening of a throttle valve, timing of spark provided by spark plugs, timing and amount of fuel injected by fuel injectors, cylinder actuation/deactivation, intake and exhaust valve phasing, output of one or more boost devices (e.g., turbochargers, superchargers, etc.), opening of an EGR valve, and/or one or more other engine actuators. In various implementations, the propulsion torque requests 244 may be adjusted or modified before use by the actuator control module 248, such as to create a torque reserve.

The motor control module 196 controls switching of switches of an inverter module based on the motor torque request 234, as discussed further below. The inverter module converts direct current (DC) power into alternating current (AC) power. The inverter module applies AC power to the motor 198. Switching of the inverter module controls torque of the electric motor 198. The inverter module also converts power generated by the electric motor 198 into DC power and outputs DC power for the battery 199, for example, to charge the battery 199.

The inverter module includes a plurality of switches, such as three legs of switches. The motor control module switches the switches to apply alternating current (AC) power to the electric motor 198 to drive the electric motor 198. For example, the inverter module may generate n-phase AC power and apply the n-phase AC power to (e.g., a, b, and c, or u, v, and w) n stator windings of the electric motor 198. In various implementations, n is equal to 3. Magnetic flux produced via current flow through the stator windings drives a rotor of the electric motor 198. The rotor is connected to and drives rotation of an output shaft of the electric motor 198. The output shaft of the electric motor 198 is connected to one or more wheels of the vehicle. As discussed further below, the stator windings may also be used to boost a voltage from a charging station to a higher voltage of the battery 199.

In various implementations, one or more filters (e.g. capacitors) may be implemented. The one or more filters may be implemented, for example, to filter power flow between the inverter module and the battery 199.

Figure 3:
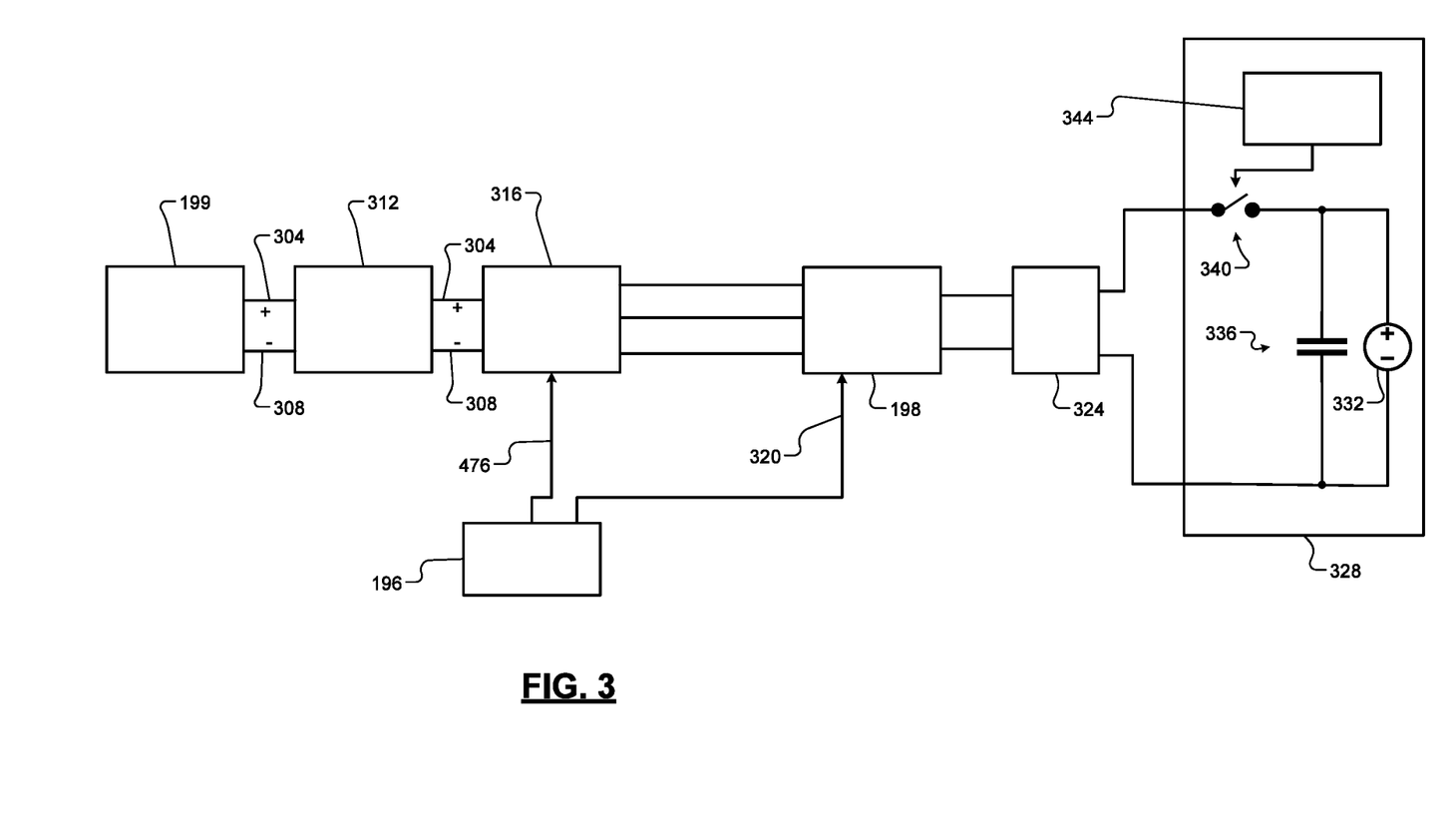
FIG. 3 includes a schematic including an example implementation of a power control system.

FIG. 3 includes a schematic including an example implementation of a power control system. The battery 199 may also be referred to or include a battery pack, as discussed above. The battery 199 may have a voltage of 800 V DC or another suitable voltage rating.

High (positive, DC+) and low (negative, DC−) sides 304 and 308 are connected to positive and negative terminals, respectively, of the battery 199. One or more capacitors, such as capacitor 312, are connected in parallel with the battery 199 between the high and low sides 304 and 308. The capacitor(s) 312 stabilize the DC bus and provide a low impedance voltage source to the inverter module since the battery 199 may have a higher impedance.

The inverter module 316 includes three legs, one leg connected to each phase of the electric motor 198. The inverter module 316 controls current flow to the legs/phases of the electric motor 198. The inverter module 316 converts DC power from the high and low sides 304 and 308 into 3-phase AC power and outputs the AC power to the electric motor 198.

Figure 4:
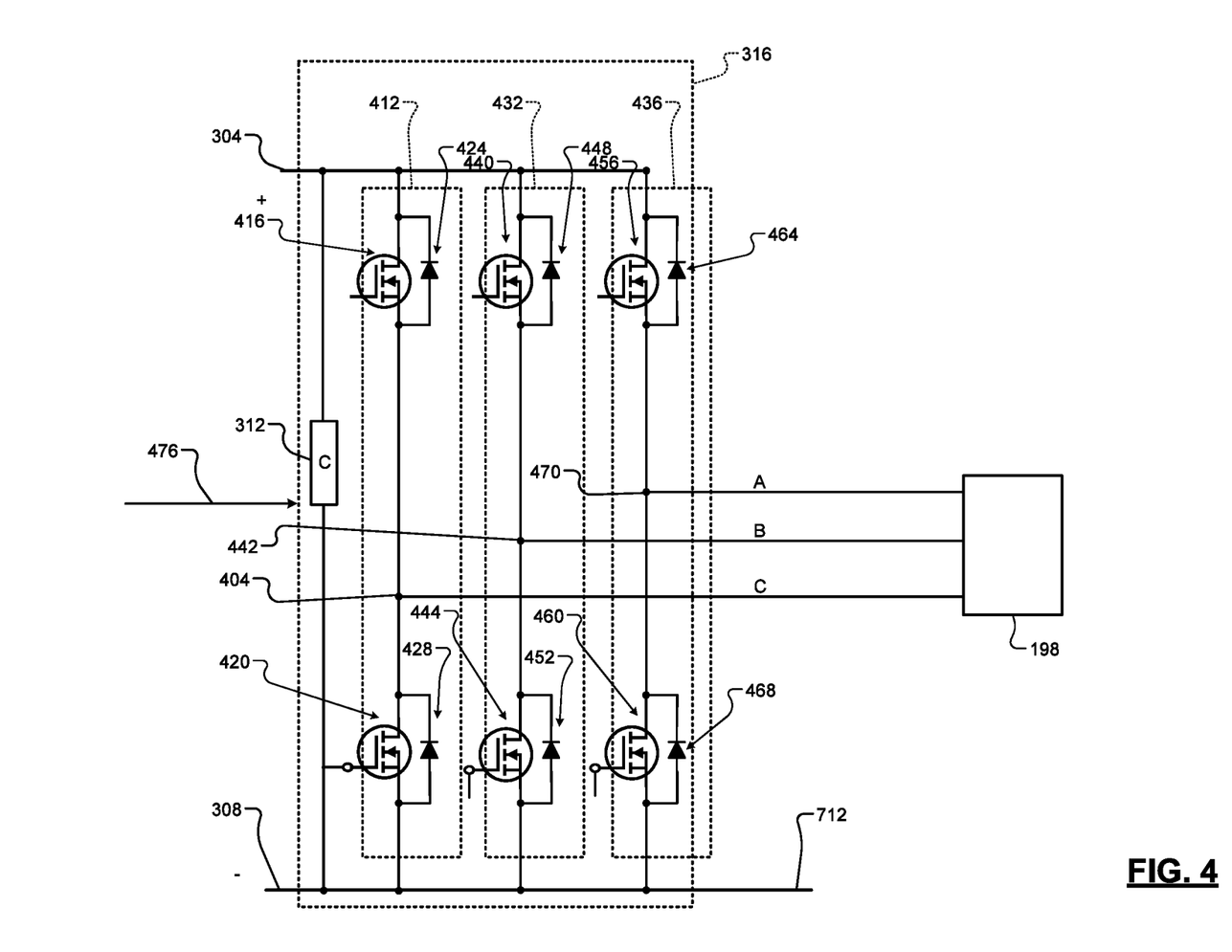
FIG. 4 includes a schematic of example implementations of an inverter module.

FIG. 4 includes a schematic of an example implementation of the inverter module 316. The inverter module 316 includes three legs. One leg is connected to each phase of the electric motor 198.

A first leg 412 includes first and second switches 416 and 420. The switches 416 and 420 each include a first terminal, a second terminal, and a control terminal. Each of the switches 416 and 420 may be an insulated gate bipolar transistor (IGBT), a field effect transistor (FET), such as a metal oxide semiconductor FET (MOSFET), or another suitable type of switch. In the example of IGBTs and FETs, the control terminal is referred to as a gate.

The first terminal of the first switch 416 is connected to the high side 304. The second terminal of the first switch 416 is connected to a node 404. The second terminal of the second switch 420 may be connected to the low side 308. The node 404 is connected to the second terminal of the first switch 416, the first terminal of the second switch 420, and a first phase (e.g., a) of the electric motor 198.

The first leg 412 may include first and second diodes 424 and 428 connected anti-parallel to the switches 416 and 420, respectively. In other words, an anode of the first diode 424 may be connected to the second terminal of the first switch 416, and a cathode of the first diode 424 may be connected to the first terminal of the first switch 416. An anode of the second diode 428 may be connected to the second terminal of the second switch 420, and a cathode of the second diode 428 may be connected to the first terminal of the second switch 420. The diodes 424 and 428 form one phase of a three-phase rectifier for converting power from the electric motor 198 into power for the battery 199. However, the diodes 424 and 428 may be omitted, such as if switches 416, 440, 446, 420, 444, and 460 are MOSFETS (with a built in diode). The diodes 424 and 428 may be included if included with a power module of an IGBT.

The inverter module 316 also includes second and third legs 432 and 436. The second and third legs 432 and 436 may be (circuitry wise) similar or identical to the first leg 412. In other words, the second and third legs 432 and 436 may each include respective switches and diodes like the switches 416 and 420 and the diodes 424 and 428, connected in the same manner as the first leg 412. For example, the second leg 432 includes switches 440 and 444 and antiparallel diodes 448 and 452. A node 442 is connected to the first terminal of the switch 444, and a second stator winding (e.g., b) of the electric motor 198. The third leg 436 includes switches 456 and 460, and anti-parallel diodes 464 and 468. A node 470 is connected to the first terminal of the switch 460 and a third stator winding (e.g., c) of the electric motor 198. Like the diodes 424 and 428, the diodes 448, 452, 464, and 468 may be omitted.

Control terminals of the switches of the inverter module 316 are connected to switch signals 476 from the motor control module 196. The motor control module 196 generates the switch signals 476 such that the high side switch of a leg is on while the low side switch of that leg is off and vice versa. The motor control module 196 generates the switch signals 476 using pulse width modulation (PWM) control.

The switch signals of the gates of the low side switches 420, 444, and 460 may be inverted such that the switch signals applied to the low side switches 420, 444, and 460 are opposite in polarity to the control signals applied to the gates of the high side switches 416, 440, and 456.

Figure 5:
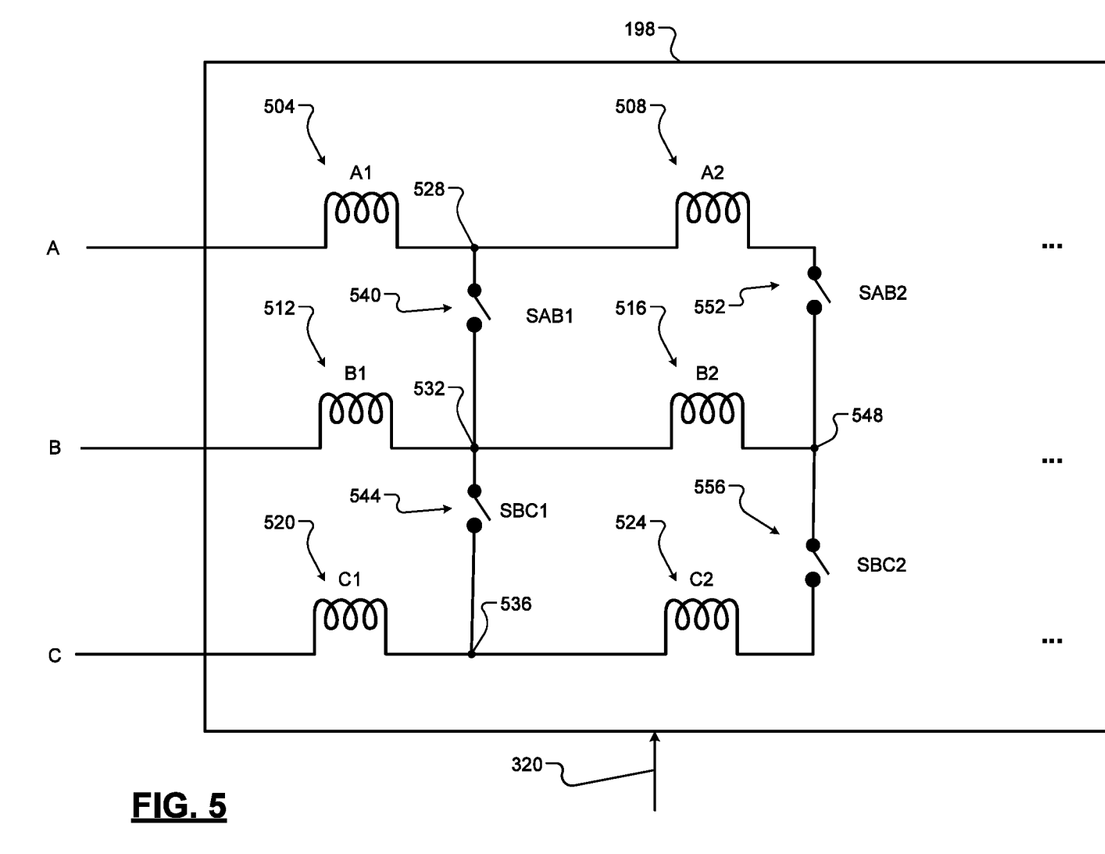
FIGS. 5 and 6 are schematics of example implementations of a motor.

FIG. 5 is a schematic of an example implementation of the motor 198. The stator windings of the motor 198 are each divided into two or more inductive stator winding sections. For example, a first phase (A) of the motor 198 includes first and second stator windings (A1 and A2) 504 and 508. A second phase (B) of the motor 198 includes third and fourth stator windings (B1 and B2) 512 and 516. A third phase (C) of the motor 198 includes fifth and sixth stator windings (C1 and C2) 520 and 524.

First ends of the first, third, and fifth stator windings 504, 512, and 520 are connected to the nodes 470, 442, and 404, respectively, of the inverter module 316. Second ends of the first, third, and fifth stator windings 504, 512, and 520 are connected to nodes 528, 532, and 536, respectively. A first switch (SAB1) 540 is connected between the node 528 and the node 532. A second switch (SBC1) 544 is connected between the node 532 and the node 536.

Figure 6:
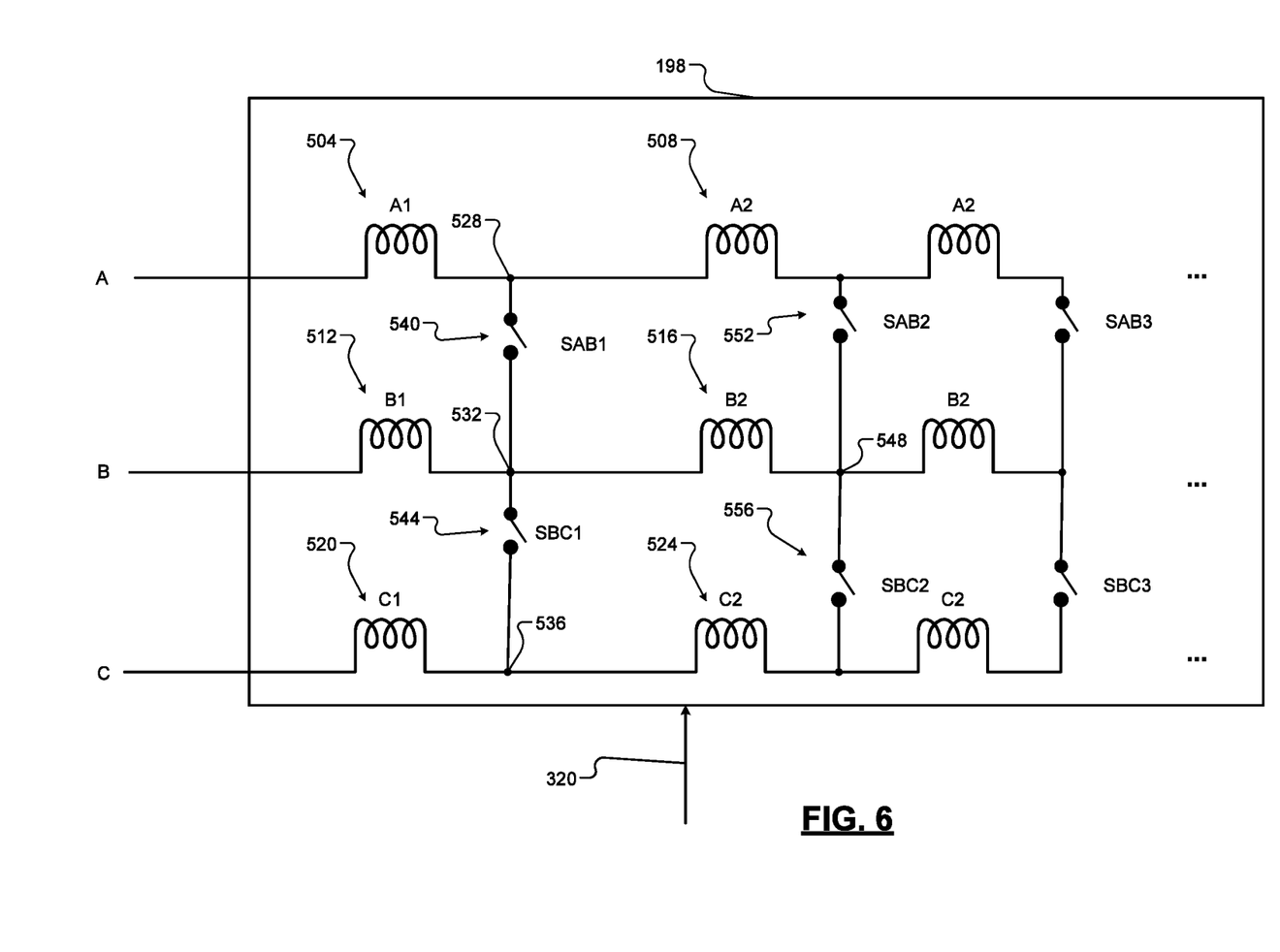

First ends of the second, fourth, and sixth stator windings 508, 516, and 524 are connected to the nodes 528, 532, and 536, respectively. A second end of the fourth stator winding 516 is connected to a node 548. A third switch (SAB2) 552 is connected between a second end of the second stator winding 508 and the node 548. A fourth switch (SBC2) 552 is connected between a second end of the sixth stator winding 524 and the node 548. While the example of each phase being divided into 2 stator windings (e.g., first phase includes 504 and 508), the motor 198 may include N stator windings connected in series per phase where N is an integer greater than or equal to 2. For additional stator windings per phase, additional switches like the third and fourth switches 552 and 556 would also be included and connected in the same way between two phases. An example implementation including 3 stator windings connected in series per phase is illustrated in FIG. 6.

Each of the stator windings 504, 508, 512, 516, 520, and 524 may have the same inductance and the same number of turns. The inductance may be, for example, between 1/10 millihenry (mH) and 100 mH or another suitable inductance. The inductance and the number of turns may be selected to minimize a torque output during charging of the battery 199 and minimizes a loss of the motor 198. The first, second, third, and fourth switches 540, 544, 552, 556 may include bidirectional switches, such as wide band gap (WBG) switches.

Referring to FIG. 3 and FIG. 5, the motor control module 196 controls switching of the switches 540, 544, 552, and 556 of the motor 198 via motor switch signals 320. For example, when a speed (e.g., target speed or present speed) of the motor 198 is greater than a predetermined speed, the motor control module 196 may use only a portion of each of the stator windings (e.g., only the first, third, and fifth stator windings 504, 512, and 520). To do this, the motor control module 196 controls switching of the inverter module 316, selectively closes the second and fourth switches (SAB2 and SBC2) 552 and 556, and selectively opens the first and third switches (SAB1 and SBC1) 540 and 544. When the speed (e.g., target speed or present speed) of the motor 198 is less than the predetermined speed, the motor control module 196 may use all portions of the stator windings (504, 508, 512, 516, and 520 and 524). To do this, the motor control module 196 controls switching of the inverter module 316, selectively opens the second and fourth switches (SAB2 and SBC2) 552 and 556, and selectively closes the first and third switches (SAB1 and SBC1) 540 and 544. In this manner, the stator windings are reconfigurable to perform a function similar to that of a gear change in a transmission.

As shown in FIG. 3, the vehicle includes a charge port 324 through which the vehicle can receive or transmit power. For example, a charger 328 can be connected to the charge port 324 via a charge cable to charge the battery 199. As stated above, the battery 199 has a first voltage rating, such as 800 V DC. The charger 328 has a second voltage rating that is less than the first voltage rating, such as 400 V DC. The motor control module 196 controls switching of the switches of the motor 198 to boost the voltage from the charger 328 using the stator windings of the motor 198 to charge the battery 199 with power from the charger 328.

The charger 328 includes a DC power source 332 that outputs voltage at the second voltage rating. One or more capacitors 336 may be connected in parallel with the DC power source 332. A switch 340 is configured to close and output power from the DC power source 332 and to open stop outputting power from the DC power source 332. A charge control module 344 controls switching of the switch 340. For example, the charge control module 344 may communicate with the motor controller (e.g., via a conductor of the charge cable) and close the switch 340 when the charge cable is connected to the charge port 324 and the motor control module 196 is controlling switching of the motor 198 and the inverter module 316 to boost the voltage from the charger 328 and charge the battery 199. By using the motor 198 to boost the voltage of the charger 328 and charge the battery 199, a separate DC/DC converter is not needed to convert the output voltage of the charger 328 to a voltage sufficient to charge the battery 199. This decreases cost. While the example of the switch 340 and the capacitor 336 being part of the charger 328 is provided, the switch 340 and the capacitor 336 may be part of the vehicle. In this example, the switch 340 may be controlled by the motor control module 196 or another control module of the vehicle.

The phases/legs of the inverter module 316 and the stator windings work together as a boost converter to boost from, for example, a 400 V DC output of the charger 328 to 800 V DC to charge the battery 199. The stator winding inductances and the respective phase low side switches of the inverter module 316 (e.g., 420, 444, 460) are controlled to act as an interleaved 2 phase boost converter. The motor control module 196 may control pulse width modulation (PWM) frequency, duty cycle, and phase shift between the two phase legs (e.g., B and C) based on power of the charger 328 and a position of the rotor of the motor 198.

Figure 7:
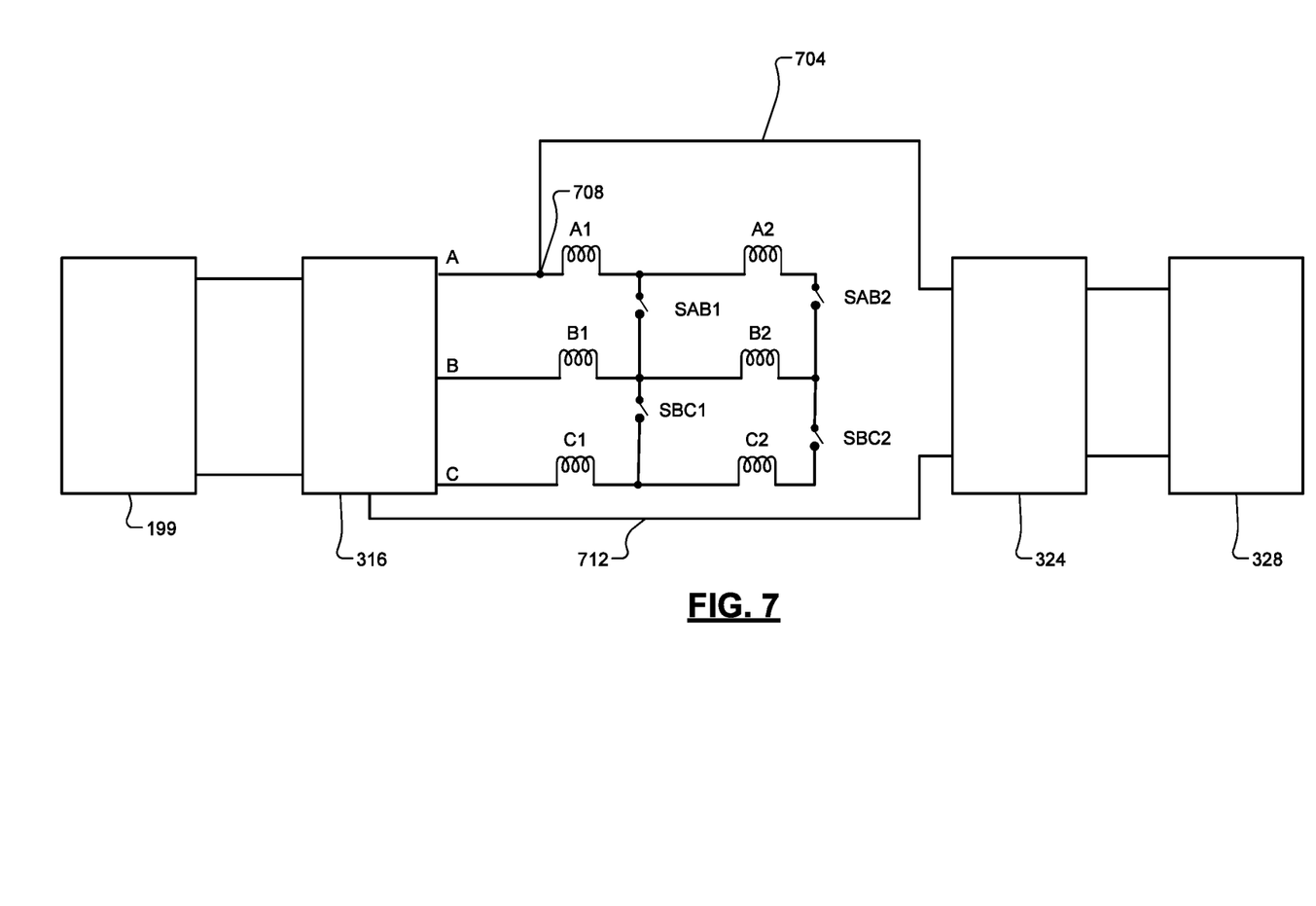
FIGS. 7 and 8 include example schematics of battery charging systems.
Figure 8:
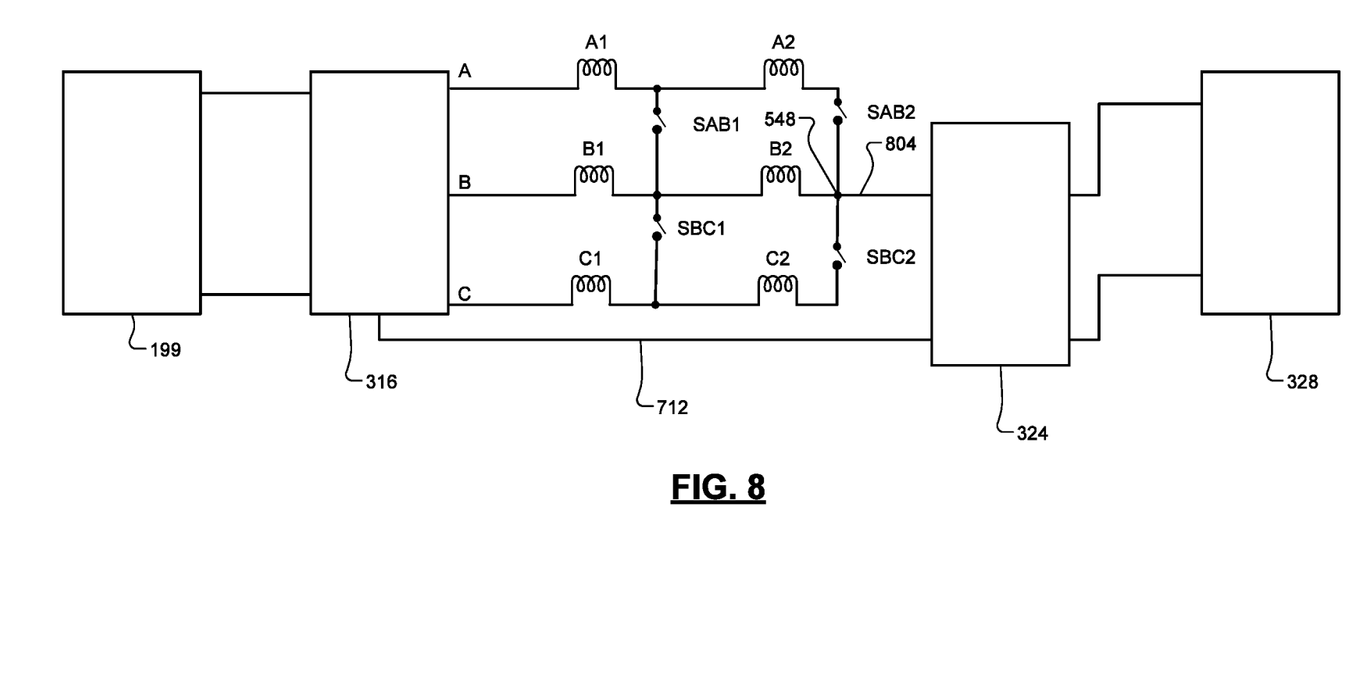

FIGS. 7 and 8 include example schematics of battery charging systems. FIGS. 7 and 8 illustrate how the charge port 324 can be connected to the motor 198. FIG. 7 includes an example schematic for a three terminal machine where the high side 704 is connected to a node 708 that is connected to the first end of the first stator winding 504 of the first phase of the motor 198. The low side 712 is connected to the low side 308 of the inverter module 316 as illustrated in FIG. 4. FIG. 8 includes an example schematic for a four terminal machine where the high side 804 is connected to the node 548 of the motor 198. The low side 712 is connected to the low side 308 of the inverter module 316 as illustrated in FIG. 4.

To charge the battery 199 via the motor 198 and the inverter module 316 as a boost converter via the second phase (B), the motor control module 196 may (e.g., continuously) close the switches 552 and 556 of the motor 198, open the switches 540, 544, close the switch 444 of the inverter module 316 and open all of the other switches of the inverter module 316 for a first period. This energizes the first, second, third, and fourth stator windings 504, 508, 512, and 516. For (e.g., continuously) a second period after the first period, the motor control module 196 may maintain the third and fourth switches 552 and 556 of the motor 198 closed, maintain the first and second switches 540, 544, open, and open the switch, allowing current to flow from phase B via the diode 448 into the positive DC bus 304. The switch 440 may also be closed during the second period when the diode 448 carries current to reduce the power loss. This charges the capacitor 312 and the battery 199. The other switches of the inverter module 316 will be maintained open. While the example of closing the third and fourth switches 552, 556 and opening the switches 540, 544 is provided, alternatively the motor control module 196 may open the third and fourth switches 552, 556 and close the first and second switches 540, 544 during the first and second periods. This energizes the first and third windings 504 and 512 for charging of the battery 199.

To charge the battery 199 via the motor 198 and the inverter module 316 via the third phase (C), the motor control module 196 may (e.g., continuously) for a first period, close the third switch 552 and the fourth switch 556 of the motor 198, open the first and second switches 540 and 544, close the switch 420 of the inverter module 316 and open all of the other switches of the inverter module 316. This energizes the first, second, fifth and sixth stator windings 504, 508, 520 and 524. For (e.g., continuously) a second period after the first period, the motor control module 196 may maintain the third switch 552 and the fourth switch 556 of the motor 198 closed, maintain the first and second switches 540, 544, open, and open the switch 420 of the inverter module 316 allowing current to flow from phase C via the diode 424 into the positive DC bus 304. The switch 416 may be closed during the second period when the diode 424 carries current to reduce the power loss. This charges the capacitor 312 and the battery 199. The other switches of the inverter module 316 will be maintained open. While the example of closing the third and fourth switches 552 and 556 and opening the first and second switches 540 and 544 is provided, alternatively the motor control module 196 may open the third and fourth switches 552 and 556 and close the first and second switch 540 and 544 during the first and second periods. This energizes the first and fifth windings 504 and 520 for charging of the battery 199. While the example of charging via the phases B and C individually is discussed, the third and fourth switches 552 and 556 may both be closed to charge the battery 199 and the capacitor 312 via both phases B and C alternately or simultaneously.

While example ways of switching the switches of the motor 198 are provided, the present application is also applicable to other configurations. For example, first, fourth, sixth, and fifth stator windings 504, 516, 524, and 520 can be charged by closing the first and fourth switches 540 and 556 and opening the second and third switches 544 and 552. The first, fourth, sixth, and fifth stator windings 504, 516, 524, and 520 can be used to charge the battery 199 by pulse width modulating the switch 420 of the inverter module 316. Other configurations are also possible.

The above examples are provided relative to the example connection of FIG. 7. All three phases of the motor 198 can be used to individually or sequentially in interleaved mode, charge the battery 199 in the example of FIG. 8. For example, the motor control module 196 may close the third and fourth switches 552, 556 and open the first, second, switches 540, 544, close switch 460 and open all other switches of the inverter module 316 to charge the first and second stator windings 504 and 508 for the first period. For the second period, the motor control module 196 may maintain closed the third and fourth switches 552, 556 and maintain open the first, second switches 540, 544, open the switch 460, and maintain all other switches of the inverter module 316 open allowing current to flow from phase A via the diode 464 into the positive DC bus 304. Switch 456 may also be closed during the second period when the diode 464 carries current to reduce the power loss. As another example, the motor control module 196 may open the first, second, switches 540, 544, close 552 and 556, and close switch 444 with all other switches of the inverter module 316 open to charge the third and fourth stator windings 512 and 516 for the first period. For the second period, the motor control module 196 may maintain closed the third, and fourth switches 552 and 556, maintain open the first, and second switches 540, and 544, open the switch 444, and maintain all other switches of the inverter module 316 open allowing current to flow from phase B via the diode 448 into the positive DC bus 304. The switch 440 may also be closed during the second period when the diode 448 carries current to reduce the power loss. As another example, the motor control module 196 may close the fourth switch 556 and open the first, second, and third switches 540, 544, and 552, and open all of the switches of the inverter module 316 to charge the fifth and sixth stator windings 520 and 524 for the first period. For the second period, the motor control module 196 may maintain closed the fourth switch 556, maintain open the first, second, and third switches 540, 544, and 552, close the switch 420, and maintain all other switches of the inverter module 316 open. As another example, the motor control module 196 may open the first and second, switches 540, 544, close switches 552 and 556, and close switch 420 with all other switches of the inverter module 316 open to charge the fifth and sixth stator windings 520 and 524 for the first period. For the second period, the motor control module 196 may maintain closed the third and fourth switches 552 and 556, maintain open the first and second switches 540 and 544, open the switch 420, and maintain all other switches of the inverter module 316 open allowing current to flow from phase C via the diode 424 into the positive DC bus 304. The switch 416 may also be closed during the second period when the diode 424 carries current to reduce the power loss. While the example of charging via the phases A, B and C individually is discussed, the third and fourth switches 552 and 556 may both be closed to charge the battery 199 and the capacitor 312 via all phases A, B, and C alternately or simultaneously. Other example configurations are also possible, such as closing first and second switches 540, 544, with third and fourth switches 552, 556 open and pulse width modulating the inverter switches of each phase as described above to charge the battery via winding section four and first, third and fifth sections alternatingly or simultaneously.

Generally speaking, for a first period, the motor control module 196 closes one or more switches of the motor 198, opens all of the other switches of the motor 198, and opens all of the switches of the inverter module 316 to charge one or more stator windings of the motor 198. For a second period after (e.g., beginning at an end of) the first period, the motor control module 196 maintains the one or more switches of the motor 198 closed, maintains all of the other switches of the motor 198 open, and closes one of the switches of one of the phases of the inverter module 316, and maintains open all of the other switches of the inverter module 316. The stator winding(s) boost the input voltage from the charger 328 and charges the battery 199 via one of the phases of the inverter module 316.

Figure 9:
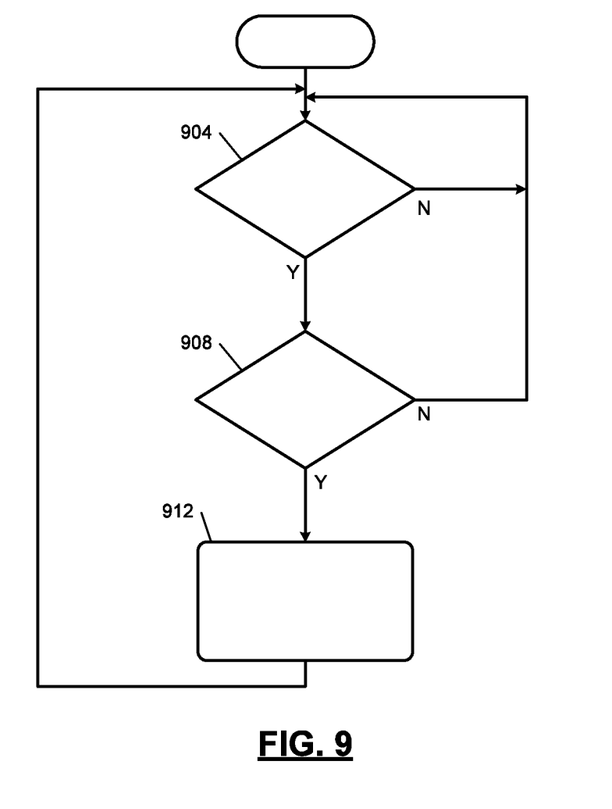
FIG. 9 includes a flowchart depicting an example method of using a charger having a lower voltage rating to charge a battery 199 having higher voltage rating by boosting the output of the charger via a motor.

FIG. 9 is a flowchart depicting an example method of using the charger 328 having the second voltage rating to charge the battery 199 having the first (greater) voltage rating by boosting the output voltage of the charger 328 via the motor 198. Control may begin when the vehicle is parked. At 904, the motor control module 196 determines whether the charger 328 having the second voltage rating that is less than the first voltage rating of the battery 199 is connected to the charge port 324. If 904 is true, control continues with 908. If 904 is false, control may return to 904.

At 908, the motor control module 196 determines whether to charge the battery 199 or not. The motor control module 196 may determine to charge the battery 199, for example, when a state of charge of the battery 199 is less than a predetermined state of charge (e.g., 90 percent or another suitable value). The motor control module 196 may determine to not charge the battery 199 when the state of charge is greater than the predetermined state of charge. The motor control module 196 may determine the state of charge of the battery 199, for example, based on one or more voltages of the battery 199, one or more currents to and/or from the battery 199, and/or one or more other parameters. If 908 is true, at 912 the charge control module 344 closes the switch 340 and the motor control module 196 controls switching of the switches of the motor 198 and the switches of the inverter module 316 to boost the output voltage of the charger 328 and charge the battery 199, such as discussed above. If 908 is false, the motor control module 196 maintains the switches of the motor 198 and the inverter module 316 open as to not charge the battery 199 at 912. Control returns to 904.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
a motor including:
a first stator winding including first and second stator winding portions electrically connected in series;
a second stator winding including third and fourth stator winding portions electrically connected in series;
a third stator winding including fifth and sixth stator winding portions electrically connected in series;
a first switch electrically connected between (a) a first node between the first and second stator winding portions and (b) a second node between the third and fourth stator winding portions;
a second switch electrically connected between (a) the second node between the third and fourth stator winding portions and (b) a third node between the fifth and sixth stator winding portions;
a third switch electrically connected between the second stator winding portion and a fourth node connected to the fourth stator winding portion; and
a fourth switch electrically connected between the sixth stator winding portion and the fourth node;
an inverter module including first, second, and third phases that are electrically connected to the first, second, and third stator windings, respectively;
a battery that has a first voltage and that is electrically connected in parallel with the inverter module;
a charger that is electrically connected to the motor and that has a second voltage that is less than the first voltage; and
a motor control module configured to selectively actuate switches of the inverter module and the first, second, third, and fourth switches of the motor and thereby charge the battery with power from the charger using at least one of the first, second, and third stator windings of the motor.

2. The system of claim 1 wherein the first, second, third, fourth, fifth, and sixth stator winding portions include inductances of between 1/10 millihenry (mH) and 100 mH.

3. The system of claim 1 wherein the first voltage is 800 volts direct current (DC).

4. The system of claim 3 wherein the second voltage is 400 volts DC.

5. The system of claim 1 wherein the motor control module is configured to, when a speed of the motor is greater than zero and less than a predetermined speed, maintain the first and second switches open and:
selectively close the third switch; and
selectively close the fourth switch.

6. The system of claim 5 wherein the motor control module is further configured to, when the speed of the motor is greater than the predetermined speed:
selectively close the first switch and open the third switch; and
selectively close the second switch and open the fourth switch.

7. The system of claim 1 wherein the charger is electrically connected to the first stator winding portion.

8. The system of claim 1 wherein the charger is electrically connected to the fourth node.

9. The system of claim 1 wherein the motor control module is configured to:
during a first period:
open all switches of the inverter module; and
close at least one of the first, second, third, and fourth switches of the motor and flow current through at least one of the first, second, and third stator windings;
open the other ones of the first, second, third, and fourth switches of the motor; and
during a second period after the first period:
close one of the switches of one of the first, second, and third phases of the inverter module; and
maintain open all of the other switches of the inverter module; and
maintain closed at least one of the first, second, third, and fourth switches of the motor and flow current through at least one of the first, second, and third stator windings; and
maintain open the other ones of the first, second, third, and fourth switches of the motor.

10. The system of claim 1 wherein:
the first stator winding further includes a seventh stator winding portion electrically connected in series with the first and second stator winding portions;
the second stator winding further includes an eighth stator winding portion electrically connected in series with the third and fourth stator winding portions;
the third stator winding further includes a ninth stator winding portion electrically connected in series with the fifth and sixth stator winding portions;
the fourth node is electrically connected between the fourth and eighth stator winding portions; and
the motor further includes:
a fifth switch electrically connected between seventh stator winding portion and a fifth node connected to the eighth stator winding portion; and
a sixth switch electrically connected between the ninth stator winding portion and the fifth node.

11. The system of claim 1 wherein the motor control module is configured to selectively actuate the switches of the inverter module and the first, second, third, and fourth switches of the motor and thereby charge the battery with power from the charger using one of the first, second, and third stator windings at a time.

12. The system of claim 1 wherein the motor control module is configured to actuate the switches of the inverter module and the first, second, third, and fourth switches of the motor and thereby charge the battery with power from the charger using the first, second, and third stator windings in a predetermined alternating order.

13. The system of claim 1 wherein the motor control module is configured to selectively actuate switches of the inverter module and the first, second, third, and fourth switches of the motor and thereby charge the battery with power from the charger using two of the first, second, and third stator windings at a time.

14. The system of claim 1 wherein the motor control module is configured to selectively actuate switches of the inverter module and the first, second, third, and fourth switches of the motor and thereby charge the battery with power from the charger using all of the first, second, and third stator windings at a time.

15. A method comprising:
selectively actuating switches of an inverter module and first, second, third, and fourth switches of a motor; and
charging a battery with power from a charger using at least one of first, second, and third stator windings of the motor,
the motor including:
   the first stator winding including first and second stator winding portions electrically connected in series;
   the second stator winding including third and fourth stator winding portions electrically connected in series;
   the third stator winding including fifth and sixth stator winding portions electrically connected in series;
   the first switch electrically connected between (a) a first node between the first and second stator winding portions and (b) a second node between the third and fourth stator winding portions;
   the second switch electrically connected between (a) the second node between the third and fourth stator winding portions and (b) a third node between the fifth and sixth stator winding portions;
   the third switch electrically connected between the second stator winding portion and a fourth node connected to the fourth stator winding portion; and
   the fourth switch electrically connected between the sixth stator winding portion and the fourth node;
   the inverter module including first, second, and third phases that are electrically connected to the first, second, and third stator windings, respectively;
   the battery having a first voltage and being electrically connected in parallel with the inverter module; and
   the charger having a second voltage that is less than the first voltage.

16. The method of claim 15 wherein the first, second, third, fourth, fifth, and sixth stator winding portions include inductances of between 1/10 millihenry (mH) and 100 mH.

17. The method of claim 15 further comprising, when a speed of the motor is greater than zero and less than a predetermined speed, maintaining the first and second switches open and:
selectively closing the third switch; and
selectively closing the fourth switch.

18. The method of claim 17 further comprising, when the speed of the motor is greater than the predetermined speed:
selectively closing the first switch and open the third switch; and
selectively closing the second switch and open the fourth switch.

19. The method of claim 15 wherein the charger is electrically connected to the first stator winding portion.

20. The method of claim 15 wherein the charger is electrically connected to the fourth node.

* * * * *